Jan. 7, 1936.  H. H. TIMKEN  2,026,807
ROLLER BEARING AXLE
Filed Jan. 8, 1934
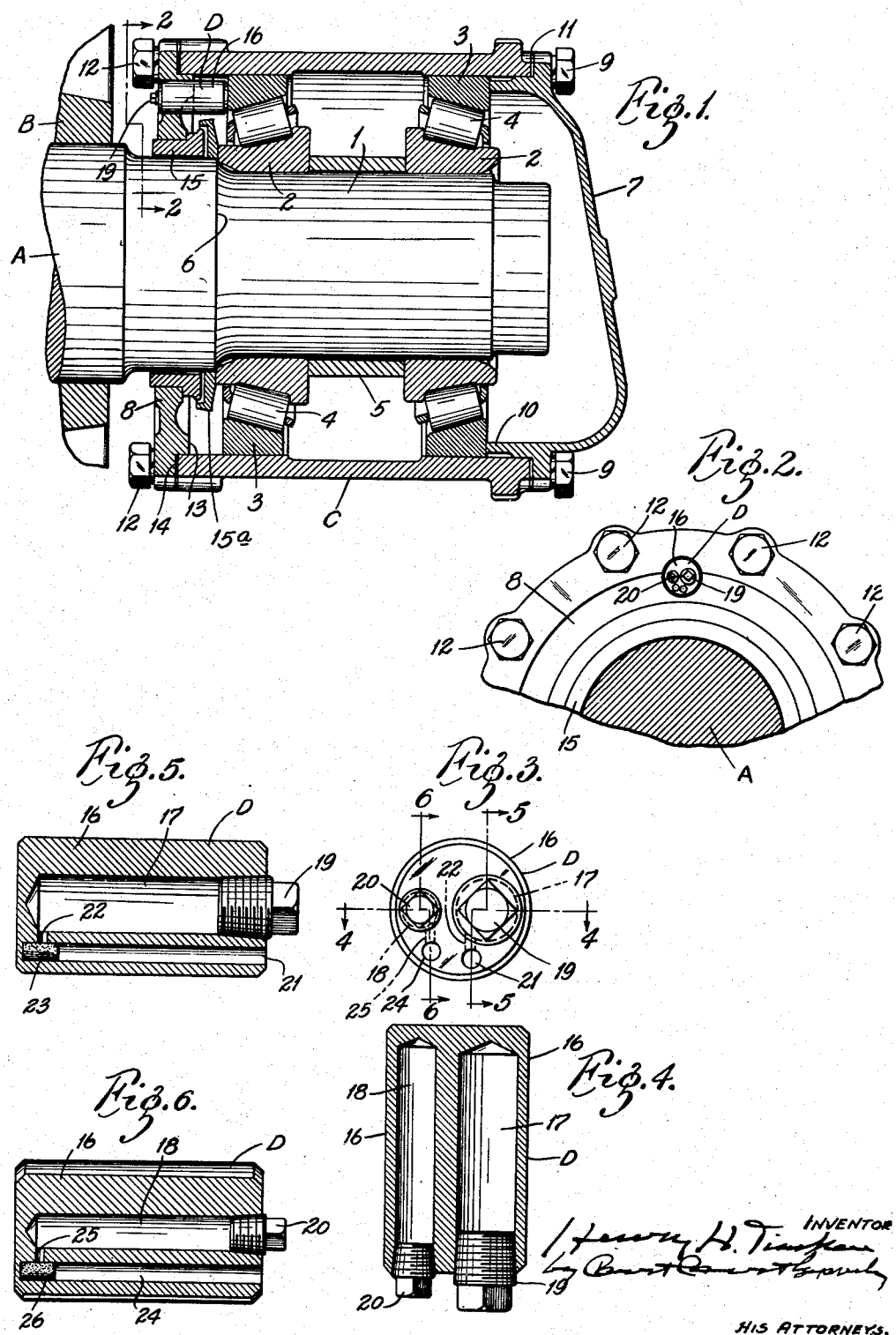
INVENTOR
Henry H. Timken
HIS ATTORNEYS.

Patented Jan. 7, 1936

2,026,807

UNITED STATES PATENT OFFICE 2,026,807

ROLLER BEARING AXLE

Henry H. Timken, Canton, Ohio, assignor to The Timken Roller Bearing Company, Canton, Ohio, a corporation of Ohio Application January 8, 1934, Serial No. 705,675

12 Claims. (Cl. 116—106)

This invention relates principally to axle constructions of the type that are equipped with roller bearings. It has for its principal objects to provide such constructions with a thermic telltale device that will indicate by sense of sight and/or by sense of smell the presence of an overheated roller bearing. Other objects are to provide a simple and efficient mounting of said telltale in the axle bearing enclosure and to provide for simplicity and cheapness of construction and compactness of design. The invention consists in the telltale and in the manner of mounting said telltale in the bearing enclosure in operative relation to the roller bearing therein.

In the accompanying drawing, which forms part of this specification and wherein like symbols refer to like parts wherever they occur, Fig. 1 is a vertical longitudinal section through the end portion of a roller bearing axle construction provided with a telltale device embodying my invention, Fig. 2 is a fragmentary transverse section on the line 2—2 in Fig. 1, Fig. 3 is an outer end view of the device, Fig. 4 is an axial section on the line 4—4 in Fig. 3, Fig. 5 is a longitudinal section on the line 5—5 in Fig. 3; and Fig. 6 is a longitudinal section on the line 6—6 in Fig. 3.

Referring to the accompanying drawing, my invention is shown in connection with a roller bearing axle construction of the outboard type; but it is also applicable to constructions of the inboard type and to other roller bearing shaft constructions. The outboard roller bearing axle construction shown in Figs. 1 and 2 comprises an axle shaft A with a wheel B thereon near its end and with a reduced portion 1 located outwardly from said wheel and extending into a journal box or housing C containing two axially spaced antifriction bearings, preferably taper roller bearings.

Each of the taper roller bearings comprises a cone or inner raceway member 2 mounted on the reduced portion 1 of the axle, a cup or outer raceway member 3 seated in the journal box, and a series of conical bearing rollers 4 interposed between said cone and said cup.

A spacer sleeve 5 is mounted on the reduced end portion 1 of the axle between the opposing ends of the two inner bearing cones 2 thereon. The cone of the innermost bearing abuts against an annular shoulder 6 formed on the axle by the reduced portion 1 thereof and the two bearing cups 3 are disposed with their remote or large ends adjacent to closure members 7 and 8, respectively, for the opposite ends of the journal box.

The closure member 7 for the outer end of the journal box is in the form of a journal box lid or cover that is removably secured by cap screws 9 to the journal box and is provided with an annular flange 10 which abuts against the cup 3 of the outermost bearing. Suitable shims 11 are interposed between the journal box and the lid 7 for adjustment of the cup cooperating therewith.

The closure 8 for the inner end of the journal box is in the form of an annular plate that is removably secured by cap screws 12 to the journal box and has an annular flange 13 that fits therein. Said closure is adjusted by means of shims 14 interposed between the closure ring 8 and the journal box. Said closure ring has an oil retaining sleeve 15 mounted therein which snugly engages the axles; and a suitable oil flinger ring 15a is mounted on the axle between said oil retaining sleeve and the cone 2 of the innermost bearing.

Mounted in the journal box C in operative relation to the cup 3 of one of the roller bearings is a thermic telltale or signal device D for indicating by sense of smell and sense of sight an overheated condition of said bearings. As shown in the drawing, said device comprises a cylindrical main body portion or cartridge 16 that has a tight fit in an opening provided therefor in the annular inner closure member 8 with its inner end in abutting relation to the adjacent face of the cup 3 of the innermost bearing. The cartridge, which is cut directly from commercial screw stock, is provided with two spaced parallel longitudinal bores or cylindrical chambers, a chamber 17, of relatively large diameter and a chamber 18 of relatively small diameter. The two chambers extend to the outer end of the cartridge and are provided with removable closure members in the form of threaded plugs 19 and 20, respectively.

The cartridge is provided adjacent to the large chamber 17 with a longitudinal outlet passageway 21 that leads from a cross-bore 22 at the inner end of said chamber to the outer end of the cartridge. A fusible plug 23 is peened tightly in place in the inner end of the outlet passageway 21 opposite the cross-bore 22 and serves to normally cut off communication between said passageway and the large chamber 17. The small chamber 18 is also provided with an outlet passageway 24 that leads from a cross-bore 25 at the inner end of the said chamber to the outer end of the cartridge. A fusible plug 26 is peened in place in the end of the outlet passageway 24 in position to block the cross-bore 25 and thus cut off communication between said passageway and the small chamber 18.

In the use of the device, small chamber 18 is filled with mercaptan or other odoriferous compound; and the large chamber 17 is filled with titanium-tetrachloride or other liquid which fumes strongly in the air in the form of visible vapor or smoke. The chambers are then closed by means of the threaded plugs, and the outlet passageways are then closed by means of the fusible plugs. The loaded cartridge is then mounted in the opening provided therefor in the end closure 8 of the journal box with its inner end in abutting relation to the adjacent end face of the cup 3 of the innermost bearing. In the event that the cup becomes heated to a critical temperature due to defects or unusual conditions in the bearing assembly, the fusible plugs will melt and thus permit the materials in the two chambers to escape through the outlet passageways to the atmosphere, the smoke and odor produced by said materials constituting a warning signal, which appeals both to the sense of sight and the sense of smell and thus indicates the bearings require attention.

It is obvious that the above described construction permits the cartridge to be refilled and the fusible plugs to be replaced without removing the cartridge from the journal box. The cartridge is simple and inexpensive and can be quickly and easily applied to roller bearing axle and shaft constructions without material alteration thereof.

What I claim is:

1. A telltale comprising a cartridge having a longitudinal chamber provided at one end with an opening, a closure for said opening, said cartridge being provided alongside of said chamber with an outlet passageway leading from said chamber to said end of said cartridge, and a fusible closure mounted in said passageway.

2. A telltale comprising a cartridge having a plurality of chambers provided at one end of said cartridge with openings, closures for said openings, said cartridge being provided with outlet passageways leading from said chambers and opening into the atmosphere at said end of said cartridge, and fusible sealing means for said passageways.

3. A telltale comprising a cartridge having a plurality of longitudinal chambers provided at one end with openings, closures for the respective openings, said cartridge being provided with longitudinal outlet passageways connected to the other ends of respective chambers and leading to the atmosphere, and fusible plugs mounted in the respective passageways adjacent to the last mentioned ends of said chambers.

4. A telltale comprising a cartridge provided with a chamber adapted to contain an odoriferous material and having at one end a filler opening, a closure for said opening, said cartridge having an outlet passageway leading from the other end of said chamber to the atmosphere at the filler end of said cartridge, and a fusible closure in said passageway.

5. A telltale comprising a cartridge provided with a chamber adapted to contain a smoke producing material and having at one end a filler opening, a closure for said opening, said cartridge having an outlet passageway leading from the other end of said chamber to the filler end of said cartridge, and a fusible sealing plug in said passageway.

6. A telltale comprising a cartridge provided with a chamber adapted to contain an odoriferous material and a chamber adapted to contain a smoke producing material, said chambers having filler openings therein at one end of said cartridge, closures for said openings, said cartridge being provided with outlet passageways leading from the respective chambers to said end of said cartridge, and fusible leak proof closure means in said passageways.

7. In combination, a shaft, a housing therefor, a roller bearing interposed between said shaft and said housing, and a thermic telltale mounted in said housing in abutting relation to said roller bearing so as to be operated by a predetermined temperature thereof and constructed to indicate by sense of smell and sense of sight an overheated condition of said bearing.

8. In combination, a shaft, a housing therefor, a roller bearing interposed between said shaft and said housing, a closure member for said housing, and a thermic telltale member mounted entirely in said closure member in abutting relation to the end face of one of the raceway members of said roller bearing and adapted to be actuated by a predetermined temperature thereof.

9. In combination, a shaft, a housing therefor, a roller bearing interposed between said shaft and said housing, and a telltale mounted in said housing with its inner end in abutting relation to said roller bearing, said telltale comprising a cartridge having a chamber therein provided with an outlet passageway leading from said chamber at a point located adjacent to the inner end of said cartridge to the outer end thereof, and a fusible member mounted in said outlet passageway.

10. In combination, a shaft, a housing therefor, a roller bearing interposed between said shaft and said housing, a closure member for said housing, and a telltale mounted in said closure member in abutting relation to the end face of one of the raceway members of said roller bearing, said telltale comprising a cartridge having a plurality of chambers provided at the outer end of said cartridge with openings, closures for the respective openings, said cartridge being provided with outlet passageways leading from the respective chambers to the outer end of said cartridge, and fusible plugs mounted in the respective passageways.

11. In a railway car axle construction, an axle, a housing therefor, a roller bearing interposed between said shaft and said housing, a closure member for said housing, and a thermic telltale member mounted in said closure member in abutting relation to the end face of one of the raceway members of said roller bearing and adapted to be actuated by a predetermined temperature thereof, said telltale comprising a cartridge having a plurality of chambers, one of said chambers containing an odoriferous material and another of said chambers containing a smoke producing material, said cartridge being provided with outlet passageways leading from the respective chambers, and fusible means for closing said outlet passageways.

12. In combination, a shaft, a housing therefor, an antifriction bearing interposed between said shaft and said housing, and a telltale comprising a cartridge mounted in said housing with its outer end exposed and with its inner end disposed adjacent to said bearing, said cartridge having a chamber therein provided at the outer end of the cartridge with a filler opening, a closure for said filler opening, said cartridge being provided with an outlet passageway leading from said chamber to said outer end of said cartridge and fusible means for sealing said passageway.

HENRY H. TIMKEN.